United States Patent
Boland

(10) Patent No.: US 11,345,316 B2
(45) Date of Patent: May 31, 2022

(54) WINDSCREEN WIPER DEVICE

(71) Applicant: TRICO BELGIUM SA, Aubange (BE)

(72) Inventor: Xavier Boland, Arlon (BE)

(73) Assignee: TRICO BELGIUM S.A., Aubange (BE)

( * ) Notice: Subject to any disclaimer, the term of this patent is extended or adjusted under 35 U.S.C. 154(b) by 311 days.

(21) Appl. No.: 16/076,795

(22) PCT Filed: Feb. 15, 2016

(86) PCT No.: PCT/EP2016/053188
§ 371 (c)(1),
(2) Date: Aug. 9, 2018

(87) PCT Pub. No.: WO2017/140343
PCT Pub. Date: Aug. 24, 2017

(65) Prior Publication Data
US 2019/0039573 A1    Feb. 7, 2019

(51) Int. Cl.
*B60S 1/34* (2006.01)
*B60S 1/40* (2006.01)
*B60S 1/38* (2006.01)

(52) U.S. Cl.
CPC .......... *B60S 1/3429* (2013.01); *B60S 1/3425* (2013.01); *B60S 1/3427* (2013.01); *B60S 1/3436* (2013.01);
(Continued)

(58) Field of Classification Search
CPC .... B60S 1/3889; B60S 1/3868; B60S 1/3853; B60S 1/3436; B60S 1/3429; B60S 1/34;
(Continued)

(56) References Cited

U.S. PATENT DOCUMENTS 1,573,618 A  *  2/1926  Laganke .............. B60S 1/3882
                                                 15/250.351
2,031,297 A  *  2/1936  Anderson ................ B60S 1/34
                                                 15/250.32
(Continued)

FOREIGN PATENT DOCUMENTS

DE   102014208968 A1   11/2015
EP        0716965 A1    6/1996
(Continued)

OTHER PUBLICATIONS

Machine translation of description portion of EP 1462328, published Feb. 2004. (Year: 2004).*
(Continued)

*Primary Examiner* — Gary K. Graham
(74) *Attorney, Agent, or Firm* — Bryan Cave Leighton Paisner LLP

(57) ABSTRACT

A windscreen wiper device, particularly for automobiles, comprises an elongated wiper blade of a flexible material, which can be placed in abutment with a windscreen to be wiped, which wiper blade is of the flat blade type and includes at least one groove, in which groove an elastic, elongated carrier element is disposed, wherein the windscreen wiper device further comprises a mounting head for transferring a reciprocal movement to the wiper blade, with the special feature that the windscreen wiper device further comprises a longitudinal strip-shaped arm, wherein the arm near a first end thereof is directly connected to the mounting head and near a second end thereof is directly connected to a connecting device of the wiper blade, and wherein the arm made of a resilient material is biased in order to exert a pressure onto the wiper blade towards the windscreen to be wiped.

11 Claims, 7 Drawing Sheets

(52) U.S. Cl.
CPC .......... *B60S 1/3475* (2013.01); *B60S 1/3479* (2013.01); *B60S 1/3481* (2013.01); *B60S 1/3853* (2013.01); *B60S 1/3868* (2013.01); *B60S 1/3889* (2013.01); *B60S 1/4087* (2013.01)

(58) Field of Classification Search
CPC .... B60S 1/3427; B60S 1/3425; B60S 1/3475; B60S 1/3479; B60S 1/3481; B60S 1/4087; B60S 1/345; B60S 1/3452; B60S 1/3454; B60S 1/3456; B60S 1/3886
USPC ................. 15/250.351, 250.352, 250.29
See application file for complete search history.

(56) References Cited

U.S. PATENT DOCUMENTS

| | | | | |
|---|---|---|---|---|
| 2,539,219 A | | 1/1951 | Abdelnour | |
| 2,613,385 A | | 10/1952 | Wylie | |
| 2,782,443 A | * | 2/1957 | Krohm | B60S 1/3801 |
| | | | | 15/250.452 |
| 2,861,290 A | * | 11/1958 | Ernst | B60S 1/40 |
| | | | | 15/250.32 |
| 2,915,770 A | * | 12/1959 | Scinta | B60S 1/4083 |
| | | | | 15/250.32 |
| 3,160,906 A | * | 12/1964 | Morena | B60S 1/0408 |
| | | | | 15/257.01 |
| 3,387,316 A | * | 6/1968 | Pearse | B60S 1/38 |
| | | | | 15/250.351 |
| 3,480,985 A | | 12/1969 | Forster | |
| 3,480,986 A | * | 12/1969 | Forster | B60S 1/3872 |
| | | | | 15/250.32 |
| 4,581,786 A | * | 4/1986 | Brummer | B60S 1/0408 |
| | | | | 15/250.201 |
| 4,864,678 A | * | 9/1989 | Stevens | B60S 1/32 |
| | | | | 15/250.34 |
| 5,673,456 A | | 10/1997 | Berge et al. | |
| 5,713,098 A | * | 2/1998 | Mayer | B60S 1/16 |
| | | | | 15/250.24 |
| 6,499,179 B1 | * | 12/2002 | Fink | B60S 1/0408 |
| | | | | 15/250.04 |
| 6,810,556 B1 | * | 11/2004 | Kotlarski | B60S 1/38 |
| | | | | 15/250.43 |
| 6,813,802 B2 | * | 11/2004 | Buchanan, Jr. | B60S 1/32 |
| | | | | 15/250.351 |
| 7,908,704 B2 | * | 3/2011 | Kraemer | B60S 1/3454 |
| | | | | 15/250.352 |
| 9,598,054 B2 | * | 3/2017 | Auch | B60S 1/3481 |
| 2007/0011840 A1 | | 1/2007 | Gilli | |
| 2008/0209662 A1 | * | 9/2008 | Wilms | B60S 1/3877 |
| | | | | 15/250.351 |
| 2010/0251502 A1 | * | 10/2010 | Summerville | B60S 1/3479 |
| | | | | 15/250.32 |
| 2015/0217729 A1 | | 8/2015 | Friscioni | |
| 2015/0239432 A1 | * | 8/2015 | Rousseau | B60S 1/524 |
| | | | | 15/250.04 |
| 2015/0343997 A1 | * | 12/2015 | Foss | B60S 1/3886 |
| | | | | 15/250.201 |
| 2016/0016538 A1 | | 1/2016 | Rousseau | |
| 2016/0016553 A1 | | 1/2016 | Schaeuble | |
| 2016/0023638 A1 | | 1/2016 | Kato et al. | |

FOREIGN PATENT DOCUMENTS

| | | | |
|---|---|---|---|
| EP | 0785116 A1 | | 7/1997 |
| EP | 1462328 | * | 2/2004 |
| EP | 1514752 A1 | | 3/2005 |
| EP | 2974919 A1 | | 1/2016 |
| JP | 2003-127837 | * | 5/2003 |
| WO | 2013170877 A1 | | 11/2013 |

OTHER PUBLICATIONS

International Search Report, dated Jan. 13, 2017 (PCT/EP2016/053188).

* cited by examiner

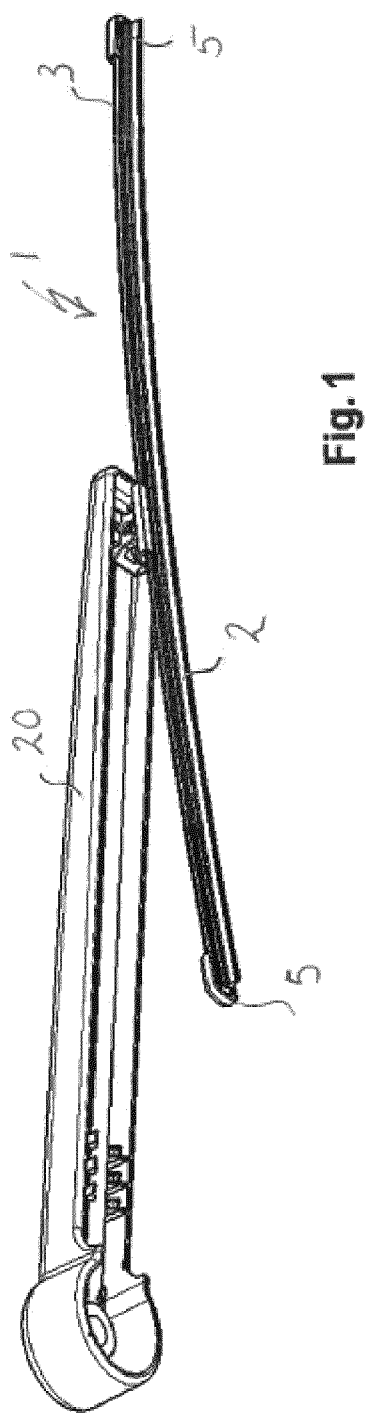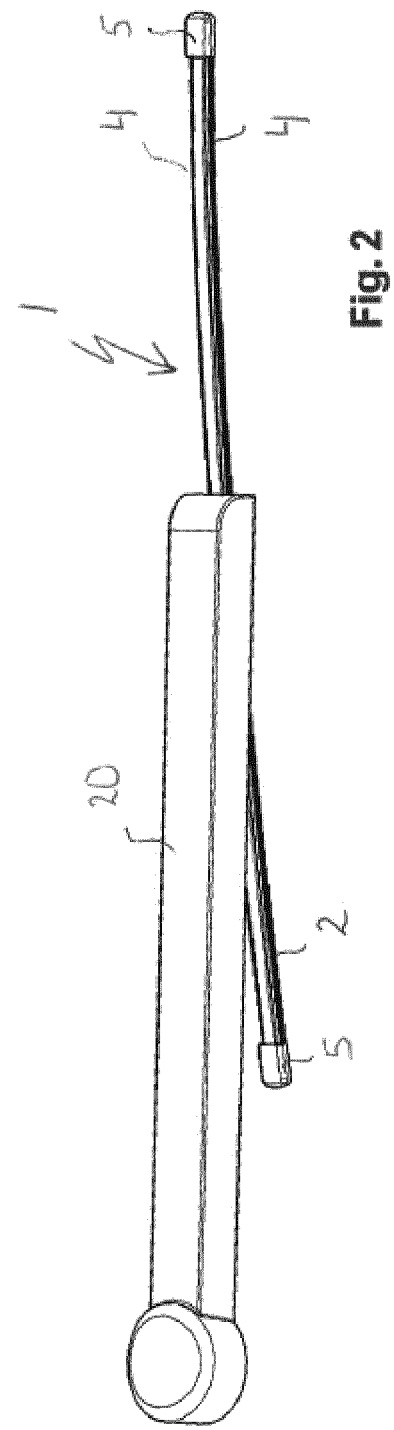

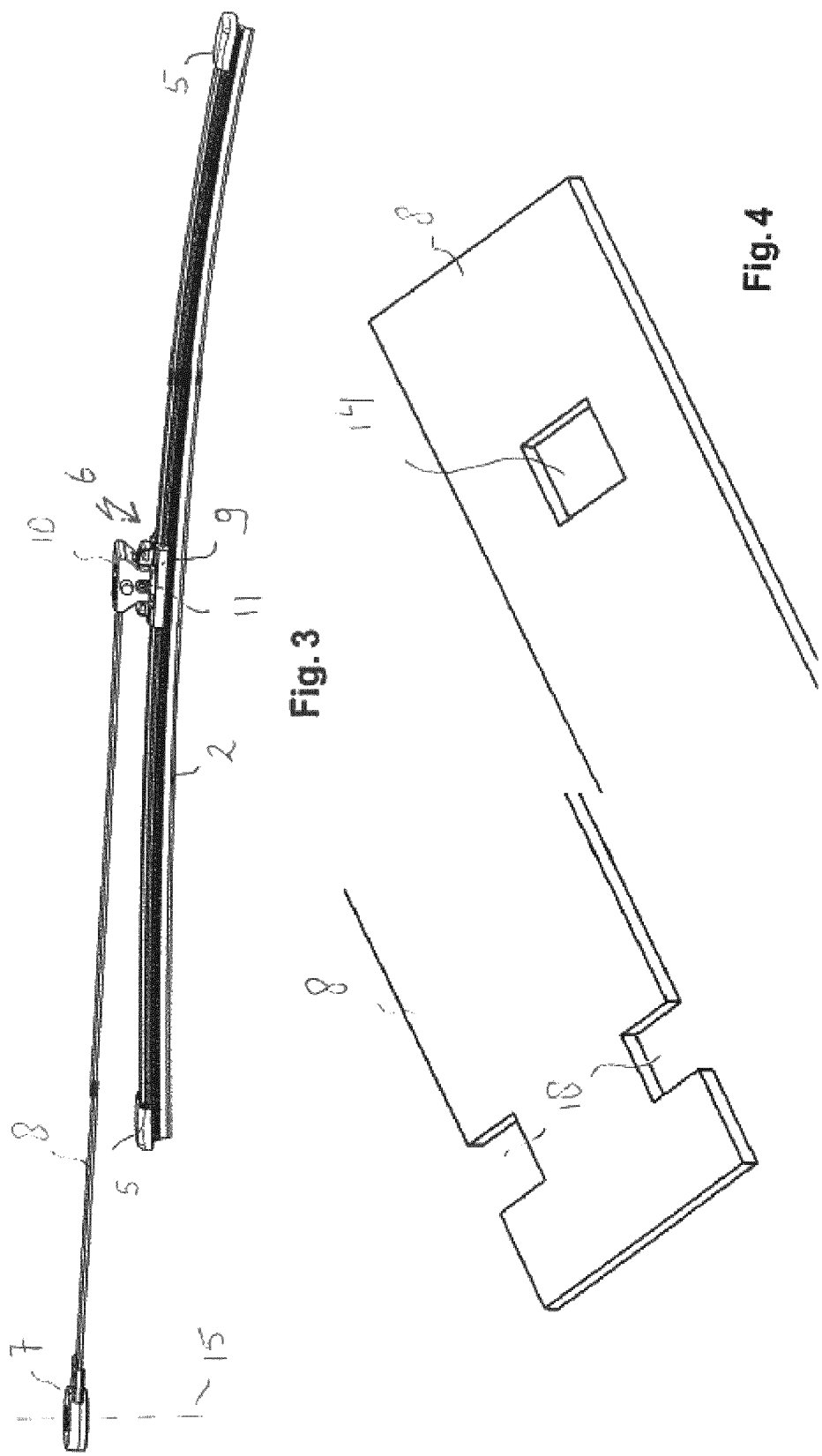

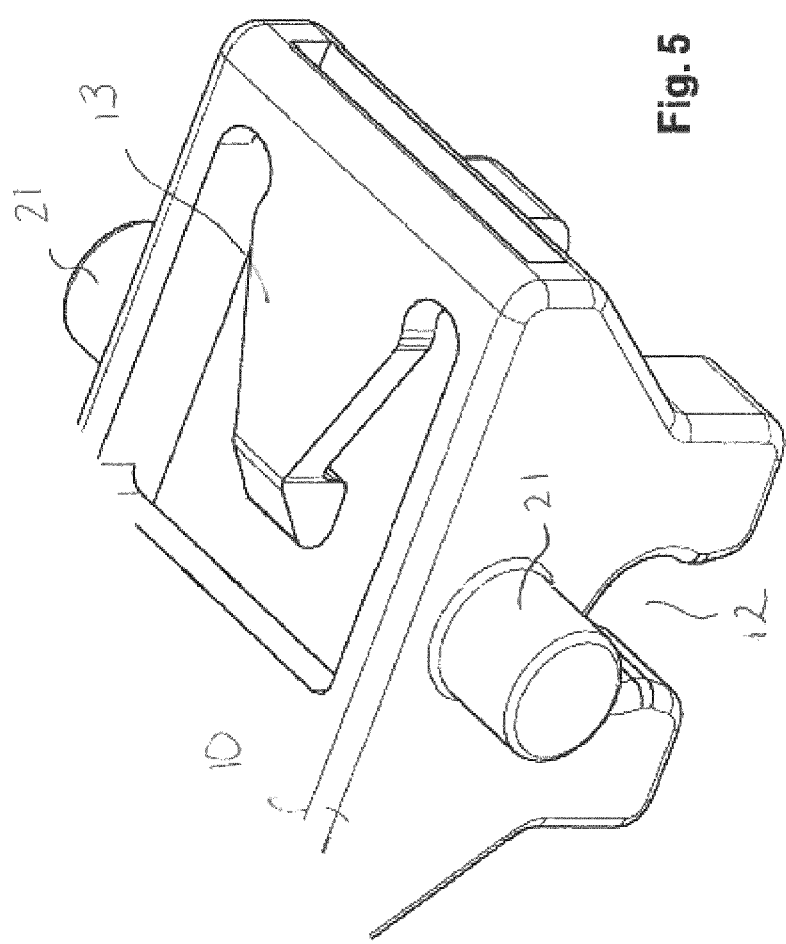

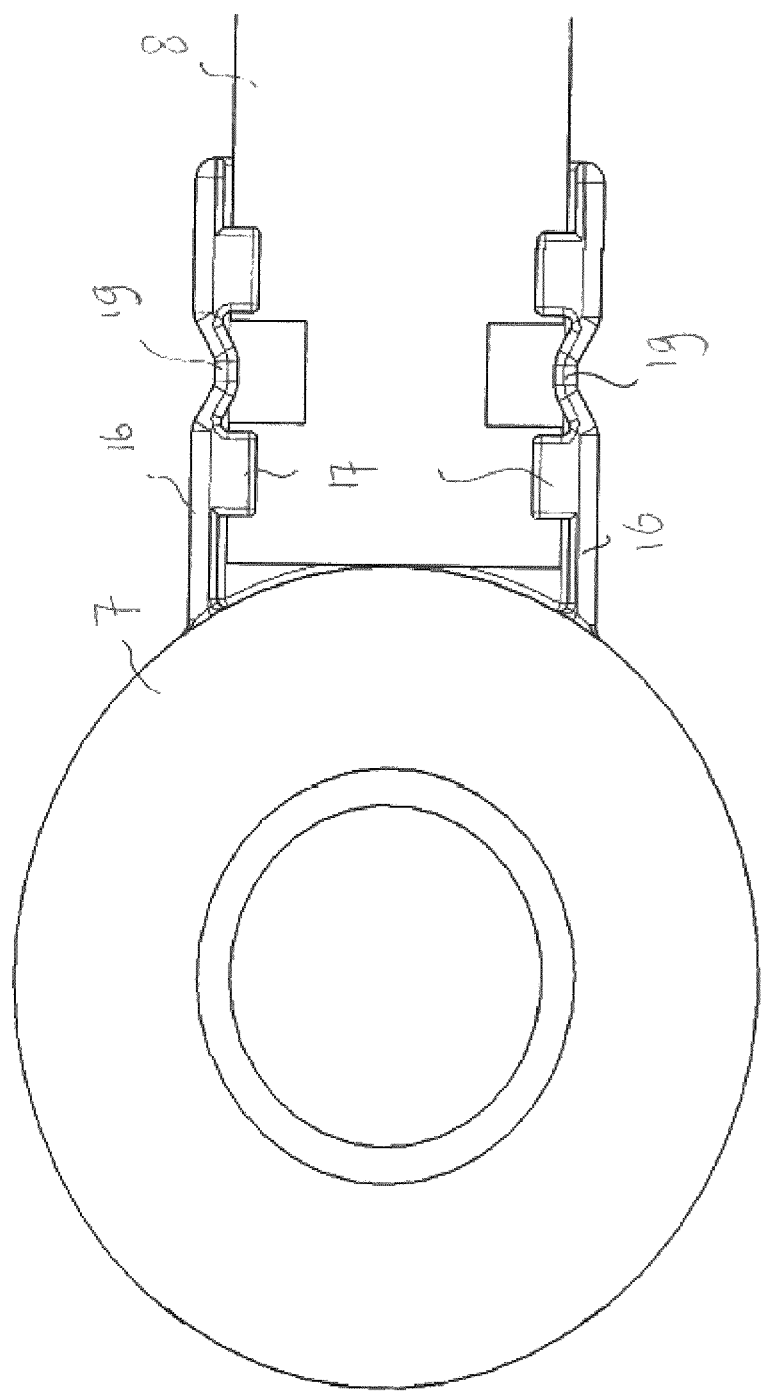

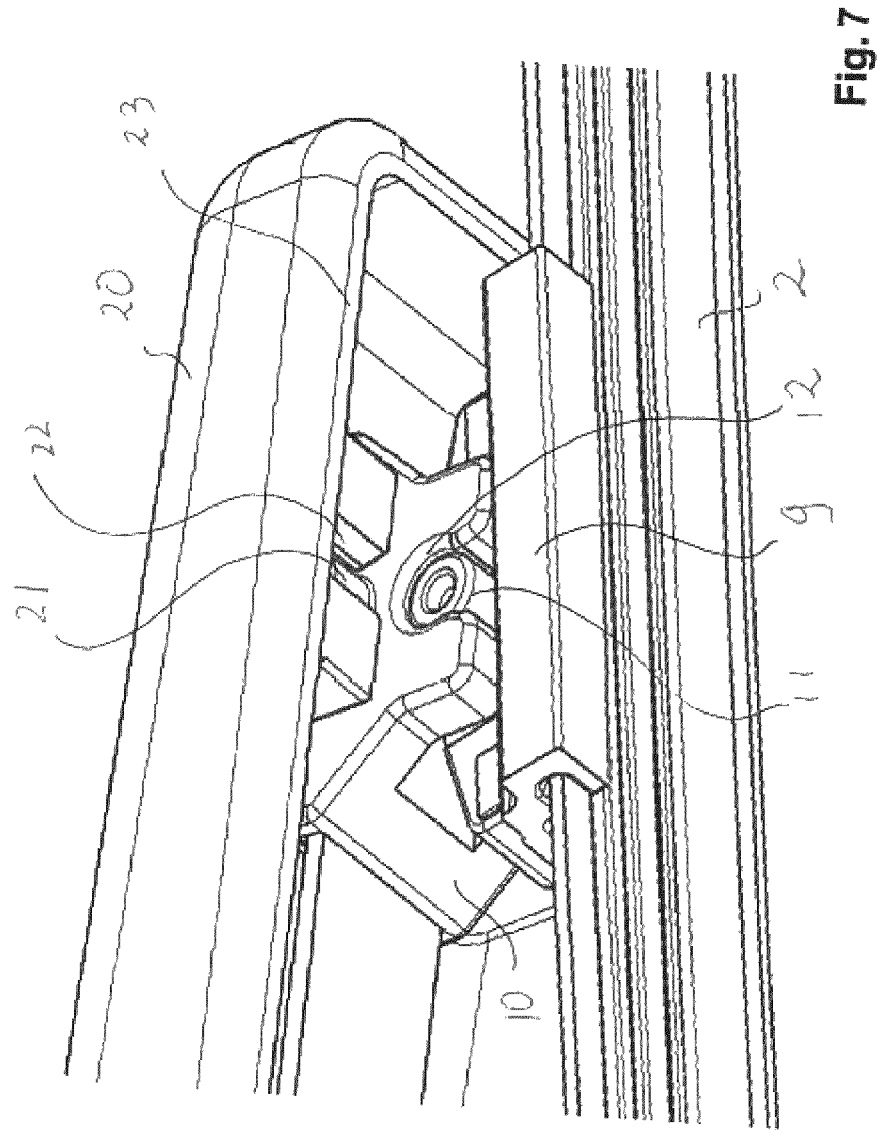

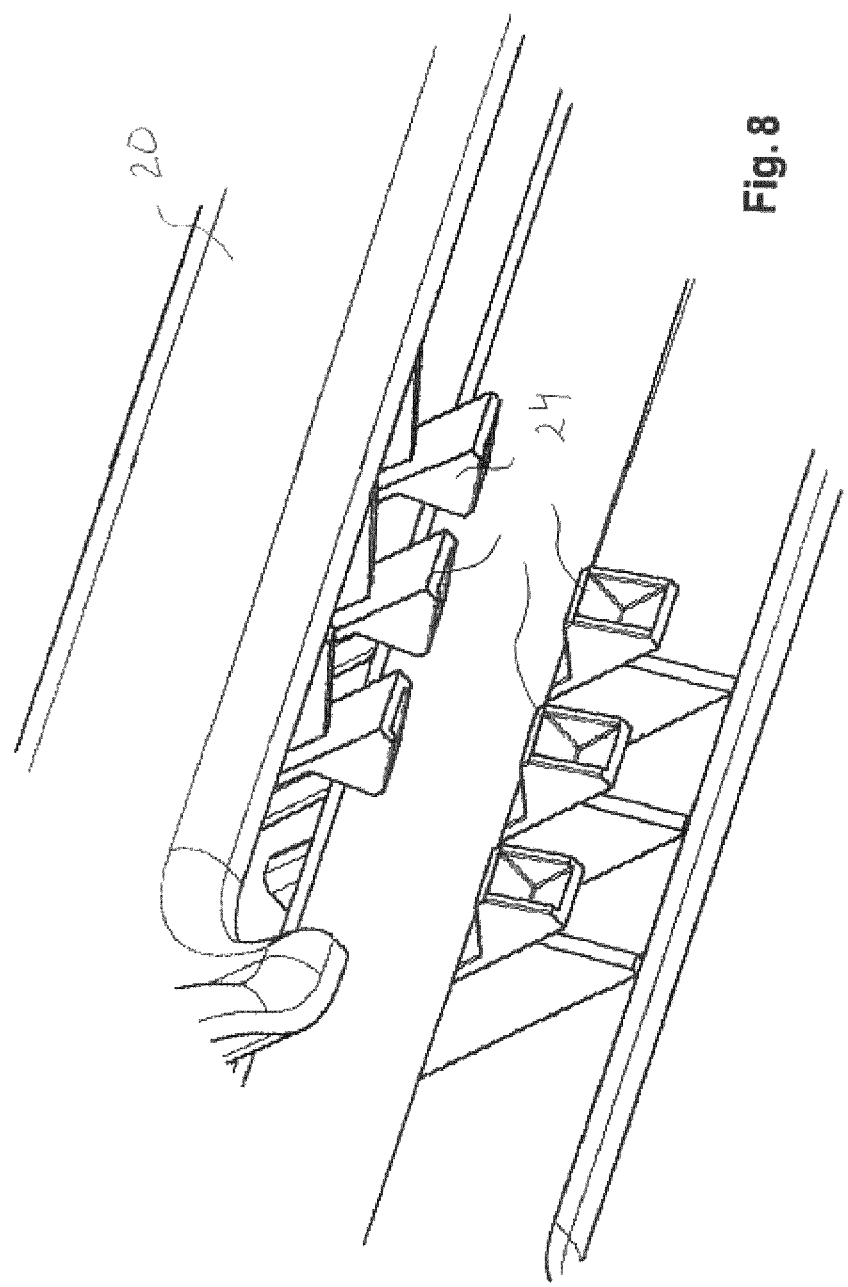

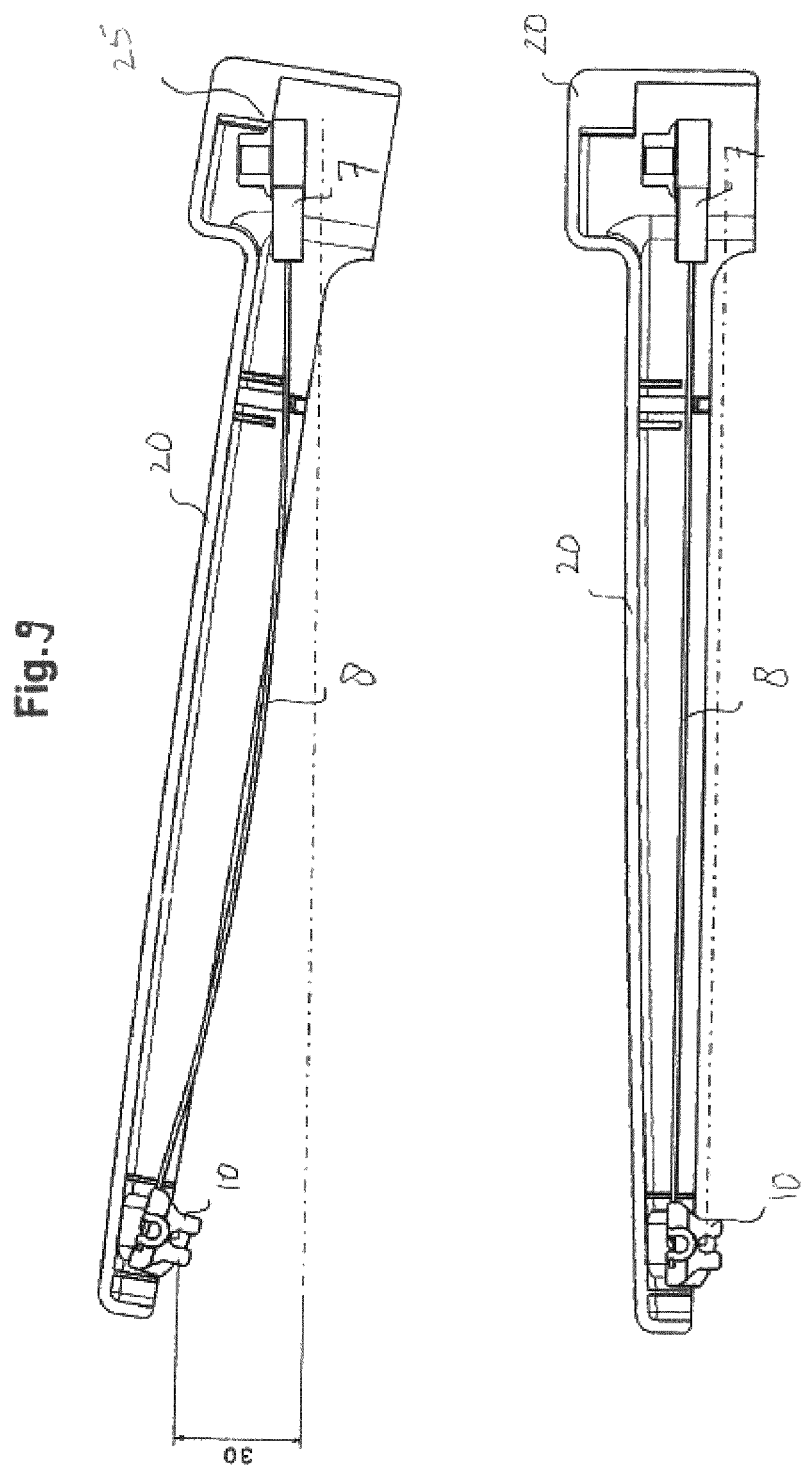

WINDSCREEN WIPER DEVICE

The invention relates to a windscreen wiper device, particularly for automobiles, comprising an elongated wiper blade of a flexible material, which can be placed in abutment with a windscreen to be wiped, which wiper blade is of the flat blade type and includes at least one groove, in which groove an elastic, elongated carrier element is disposed, wherein the windscreen wiper device further comprises a mounting head for transferring a reciprocal movement to the wiper blade. The wiper blade is preferably made in one piece through extrusion. The longitudinal groove is preferably a central longitudinal groove accommodating the carrier element. The carrier element is also called a "flexor". The wiper blade is designed as a so-called "flat blade" or "yokeless blade", wherein no use is made of several yokes pivotally connected to each other, but wherein the wiper blade is biased by the carrier element, as a result of which it exhibits a specific curvature.

It is noted that the present invention is not restricted to cars, but also refers to rail coaches and other (fast) vehicles.

Such a windscreen wiper device is known from European patent publication no. 1 514 752 (Federal-Mogul S.A.). The windscreen wiper device described in this European patent publication comprises a mounting head mountable on a drive shaft and an arm member pivotally connected to the mounting head by means of a pivot pin, wherein the arm member has a substantially U-shaped cross-section near the pivot pin comprising two side walls, wherein a part of the mounting head extends between the side walls and beyond the pivot pin.

A disadvantage of the windscreen wiper arm known from the above European patent publication is that it comprises many complex parts with a dedicated shape, wherein reference is made to the oscillating arm described therein consisting of a plastic arm member at one end thereof pivotally connected to a mounting head by means of a pivot pin and at the other end thereof folded around a rod-like part. Obviously, this needs complex machinery, tools, with all the expenses involved.

SUMMARY

It is an object of the invention to obviate this disadvantage, in the sense that at minimum costs—without using complex machinery and additional tools—a simple though effective windscreen wiper device is proposed which fits on all kinds of different cars.

Thereto, according to the invention a windshield wiper arm mentioned in the preamble is characterized in that the windscreen wiper device further comprises a longitudinal strip-shaped arm, wherein the arm near a first end thereof is directly connected to the mounting head and near a second end thereof is directly connected to a connecting device of the wiper blade, and wherein the arm made of a resilient material is biased in order to exert a pressure onto the wiper blade towards the windscreen to be wiped, the connecting device is also indicated as a "connector". The gist of the present invention is to make use of the resiliency ("or elasticity") of the arm for transmitting a force on the wiper blade in order to press the wiper blade onto the windscreen to be wiped. This not only ensures that less parts have to be used in manufacturing the windscreen wiper device with all advantages involved (such as cheaper, lighter) but also that disadvantages like wear are obviated. Preferably, the arm has the shape of a flat wire being biased (i.e. pre bend) to press the wiper blade onto the windscreen to be wiped. More preferably, the resilient material of the arm is corrosion resistant. The use of the arm allows a great flexibility in length thereof, dependent on the automobile involved.

The connecting device, the mounting head and the arm are each preferably made of one piece. The present windscreen wiper device is particularly designed for use at a rear window of a car.

Preferably, the wiper blade includes opposing longitudinal grooves on its longitudinal sides, in which grooves spaced-apart longitudinal strips of the carrier element are disposed, wherein neighboring ends of the longitudinal strips are interconnected by a respective connecting piece or "end cap", the connecting device may be glued, soldered, clipped, snapped or welded onto the longitudinal strips.

Preferably, the arm is biased in such a way that its curvature near the mounting head is larger than its curvature near the connecting device, all seen in dismounted position. In other words, in dismounted position the arm has an asymmetric shape, seen along its middle transverse plane perpendicular to a windscreen to be wiped. Thus, the wiper blade is able to follow any curvature of a windscreen to be wiped, while the wiper blade is pressed onto the windscreen to be wiper with sufficient force to enhance the wiping properties.

In a preferred embodiment of a windscreen wiper device in accordance with the invention the arm is detachably connected to the connecting device through a snapping operation. Particularly, the connecting device comprises at least one resilient tongue engaging in a correspondingly shaped hole provided in the arm, and wherein the resilient tongue is hingeable between a working position retaining the wiper blade onto the arm and an rest position releasing the wiper blade from the arm.

In a further preferred embodiment of a windscreen wiper device according to the invention the arm and the mounting head are provided with mutually cooperating protrusion/recess means for interconnecting the arm and the mounting head. Particularly, the arm comprises at least one recess at its longitudinal exterior side, and wherein the mounting head comprises a inwardly extending protrusion engaging into the recess. More in particular, the arm comprises two opposing recesses at its longitudinal exterior sides, and wherein the mounting head comprises two opposing, inwardly extending protrusions engaging into the recesses, the protrusion(s) is/are preferably made through deformation of the mounting head. Even more in particular, the mounting head has an at least substantially U-shaped cross-section at the location of its attachment to the arm, wherein each leg of the U-shaped cross-section comprises clamping members formed as inwardly bend edges at the end of the legs, which engage around longitudinal exterior sides of the arm that face away from each other, and wherein the inwardly extending protrusion(s) is/are provided on the legs of the U-shaped cross-section. In addition thereto or instead thereof, the mechanical reversal is also possible, i.e., (a) recess(es) is/are provided on the leg(s) of the U-shaped cross-section of the mounting head and (a) protrusion(s) is/are on the longitudinal exterior side(s) of the arm.

In a further preferred embodiment of a windscreen wiper device in accordance with the invention the longitudinal strip and the mounting head are interconnected through a crimping operation. The crimping operation is carried out to create the protrusion(s) of the mounting head.

In a further preferred embodiment of a windscreen wiper device according to the invention an elongated cap is connected to at least one of the mounting head, the arm and the connecting device. The cap is arranged such that it is connected to the mounting head and snapped onto the arm or such that it is connected to the connecting device and snapped onto the arm or the mounting head, the cap is participating in the torsional rigidity of the arm. Further, the cap is provided with a stop to control the (extremity of the) arm when changing the wiper blade. Finally, the cap avoids permanent deformation of the arm.

In a further preferred embodiment of a windscreen wiper device in accordance with the invention the mounting head is fixed for rotation to a shaft, wherein the shaft is rotatable alternately in a clockwise and in a counterclockwise sense carrying the mounting head into rotation. Thus, in turn the mounting head draws the connecting device into rotation and thereby moves the wiper blade. In the alternative, the mounting head is fixed for translation to a carriage, wherein the carriage can be translated alternately in a one linear direction and in another counter linear direction carrying the mounting head into translation. The present invention can therefore be used for circular or linear movement of the mounting head.

The present invention also relates to a strip-shaped arm arranged to be directly connected near a first end thereof to a mounting head of a windscreen wiper device and arranged to be directly connected near a second end thereof to a connecting device of a wiper bade of a windscreen wiper device, the arm being made of a resilient material and biased in order to exert a pressure onto the wiper blade towards a windscreen to be wiped. Preferably the arm comprises at least one recess at its longitudinal exterior side, the recess being arranged to cooperate with an inwardly extending protrusion of the mounting head, and comprising a hole being arranged to cooperate with a resilient tongue of the connecting device being movable between a working position retaining the connecting device with the wiper blade onto the arm and an rest position releasing the connecting device with the wiper blade from the arm.

The present invention further relates to a connecting device arranged to be connected to a wiper blade of a windscreen wiper device, comprising a resilient tongue being movable between a working position retaining the wiper blade onto a strip-shaped arm interconnecting the connecting device and a mounting head of the windscreen wiper device and an rest position releasing the connecting device with the wiper blade from the arm.

THE DRAWINGS

The invention will now be explained more in detail with reference to figures illustrated in a drawing, wherein FIGS. 1 and 2 are a perspective view of a preferred embodiment of a windscreen wiper device according to the invention, seen from below and above, respectively;

FIG. 3 is a perspective view of the windscreen wiper device of FIGS. 1 and 2, although without a cap;

FIG. 4 is a perspective, schematic view of both ends of a flat longitudinal strip, seen from above, as used in a windscreen wiper device of FIGS. 1, 2 and 3;

FIG. 5 is a perspective view of a connecting device, as used in a windscreen wiper device of FIGS. 1, 2 and 3;

FIG. 6 is a view from below of a mounting head and a longitudinal strip of FIG. 4, as used in a windscreen wiper device of FIGS. 1, 2 and 3;

FIGS. 7 and 8 are a perspective view of details of a windscreen wiper device of FIGS. 1, 2 and 3; and FIG. 9 relates to a side view of the windscreen wiper device of FIG. 1 shown a cap with a stop surface.

With reference to FIGS. 1, 2 and 3 a windscreen wiper device 1 is built up of an elastomeric wiper blade 2, in the longitudinal sides of which opposing longitudinal grooves 3 are formed, and of longitudinal strips 4 made of spring band steel, which are fitted in the longitudinal grooves 3, the strips 4 form a flexible carrier element for the wiper blade 2, as it were, which is thus biased in a curved position (the curvature in operative position being that of a windscreen to be wiped). Neighboring ends of the strips 4 at both ends of the wiper blade 2 are interconnected by means of connecting pieces 5 or "end caps" functioning as clamping member. In this embodiment, the connecting pieces 5 are each a separate constructional element, which may be form-locked ("positive locking" or "having a positive fit") or force-locked to the ends of the strips 4. In another preferred embodiment, the connecting pieces 5 are in one piece with the strips 4 made of spring band steel. In the latter case the connecting pieces 5 form transverse bridges for the strips 4, as it were.

The windscreen wiper device 1 is furthermore built up of a connecting device 6 of plastic material to be connected to a mounting head 7 with the interposition of an elastic flat strip-like arm 8 or "wire" made of band steel. Alternatively, the connecting device 6 may also be made of metal, such as steel or aluminum. The connecting device 6 comprises a first part 9 functioning as clamping members, which engage around longitudinal sides of the strips 4 that face away from each other, as a result of which the connecting device 6 is firmly attached to the unit consisting of the wiper blade 2 and the strips 4. Further, the connecting device 6 comprises a second part 10 functioning as a joint part that is detachably connected to the first part 9 of the connecting device 6 by engaging cylindrical protrusions 11 of the first part 9 in co-axial cylindrical recesses 12 provided in the second part 10 of the connecting device 6 (see FIG. 5). As shown, the protrusions 11 extend outwards on either side of the first part 9. The first and second parts 9, 10 of the connecting device 6 are snappingly and pivotally connected around a pivot axis at the location of the protrusions 11. As can be seen, the connecting device 6 is connected to the wiper blade 2 near its middle transversal plane.

With reference to FIGS. 4 and 5 the second part 10 comprises a resilient tongue 13 extending outwardly, so that the tongue 13 engages in an identically shaped hole 14 provided in the flat strip 8. The connecting device 6 with the wiper blade 2 is mounted onto the mounting head 7 as follows, the second part 10 can be easily slid on a free end of the flat strip 8. During this sliding movement the resilient tongue 13 is initially pushed in against a spring force and then allowed to spring back into the hole 14 in the flat strip 8, thus snapping, that is clipping the resilient tongue 13 into the hole 14 of the flat strip 8. This is a so-called bayonet-connection. The flat strip 8 together with the second part 10 may then be clipped onto the first part 9 in order to be ready for use. Dismounting the wiper blade 2 from the second part 10 is thus realized by unclipping the first part 9 together with the wiper blade 2 from the second part 10 with the flat strip 8.

As illustrated in FIG. 3 the windscreen wiper device 1 according to the invention comprises a plastic or metallic mounting head 7 which can be fixed for rotation to a shaft 15 driven, via a mechanism not illustrated, by a small motor. In use, the shaft 15 rotates alternately in a clockwise and in a counter-clockwise sense carrying the mounting head 7 into rotation also, which in turn draws the connecting device 6.

Referring to FIG. 6 the mounting head 7 has a U-shaped cross-section at the location of its connection to the flat strip 8. Each leg 16 of the U-shaped cross-section of the mounting head 7 comprises clamping members formed as inwardly bended edges 17 integral with the legs 16, wherein during use the edges 17 engage round longitudinal exterior sides of the flat strip 8 that face away from each other. Thus an enhanced retention of the flat strip 8 onto the mounting head 7 is achieved in vertical direction, i.e. perpendicular to the longitudinal direction of the mounting head 8. In order to enhance retention of the flat strip 8 onto the mounting head also in longitudinal direction, the flat strip 8 comprises two opposing recesses 18 at its longitudinal exterior sides (see FIG. 4), wherein the mounting head 7 comprises two opposing, inwardly extending protrusions 19 engaging into the recesses 18 of the flat strip 8, the protrusions 19 are made through a crimping operation after sliding the flat strip 8.

With reference to FIGS. 7 and 8 showing a cap 20, wherein sidewardly and outwardly extending cylindrical protrusions 21 of the second part 10 of the connecting device 6 (see FIG. 5) engage into correspondingly shaped recesses 22 provided on opposing sidewalls 23 of the cap 20. As shown in FIG. 8, the sidewalls 23 of the cap 20 comprise ribs 24 for retaining the flat strip 8 inside the cap 20.

In FIG. 9 the windscreen wiper device 1 of FIG. 1 is shown in a side view in a lifting or service position (above), wherein the wiper blade 2 can be replaced and/or repaired, and in a working or wiping position (below) wherein a windscreen can be wiped. As shown, the cap 20 is provided with an internal stop surface 25 to limit a movement of the arm 8 in a direction away from the windscreen to be wiped beyond the lifting position.

The invention is not restricted to the variants shown in the drawing, but it also extends to other embodiments that fall within the scope of the appended claims.

The invention claimed is:

1. A windscreen wiper device, comprising an elongated wiper blade of a flexible material, which can be placed in abutment with a windscreen to be wiped, which wiper blade includes at least one groove, in which groove an elastic, elongated carrier element is disposed,
wherein said windscreen wiper device further comprises a mounting head for transferring a reciprocal movement to said wiper blade,
wherein said windscreen wiper device further comprises a longitudinal strip-shaped arm having opposing longitudinal exterior sides,
wherein said arm near a first end thereof is directly connected to said mounting head and near an opposite second end thereof is directly connected to a connecting device of said wiper blade,
wherein said arm is made of a resilient material and is biased in order to exert a pressure onto said wiper blade towards the windscreen to be wiped,
and wherein said windscreen wiper device further comprises an elongated cap connected directly to said arm adjacent said first end thereof and connected directly to said connecting device adjacent said second end of said arm, wherein said cap comprises a stop service to limit a movement of said arm in a direction away from the windscreen to be wiped from a working position into a lifting position.

2. A windscreen wiper device according to claim 1, wherein said windscreen wiper device further comprises two connecting pieces each positioned near an end of said wiper blade and connected to an end of said carrier element.

3. A windscreen wiper device according to claim 1, wherein said arm is detachably connected to said connecting device through a snapping operation.

4. A windscreen wiper device according to claim 1, wherein said arm and said mounting head are interconnected through a crimping operation.

5. A windscreen wiper device according to claim 1, wherein said mounting head is fixed for rotation to a shaft, and wherein said shaft is rotatable alternately in a clockwise and in a counter-clockwise sense carrying said mounting head into rotation.

6. A windscreen wiper device according to claim 1, wherein said cap further includes a pair of opposing side walls each having a plurality of longitudinally spaced apart ribs extending therefrom for engaging said longitudinal exterior sides of said arm to releasably secure said cap to said arm between said mounting head and said connecting device.

7. A windscreen wiper device according to claim 6 wherein said connecting device has a pair of opposing sides, and wherein said connecting device includes a protrusion projecting outwardly from each opposing side thereof and said cap includes a recess formed in each opposing side wall thereof for receiving said protrusions and attaching said cap to said connecting device.

8. A windscreen wiper device according to claim 7, wherein said arm near said first end thereof includes two opposing recesses formed in said longitudinal exterior sides.

9. A windscreen wiper device according to claim 8, wherein said mounting head has a substantially U-shaped cross-section at its attachment to said arm, said U-shaped cross-section having legs with clamping members formed as inwardly bent edges at an end portion of said legs for engaging said longitudinal exterior sides of said arm, and wherein said mounting head includes opposing, inwardly extending protrusions on said legs for engaging into said recesses of said arm.

10. A windscreen wiper device according to claim 9, wherein said connecting device includes at least one resilient tongue engaging a correspondingly shaped hole provided in said arm near said second end, and wherein said resilient tongue is movable between a second working position retaining said wiper blade onto said arm and a rest position releasing said wiper blade from said arm.

11. A windscreen wiper device according to claim 7, wherein said cap is connected directly to said arm via engagement of said ribs of said cap with said longitudinal exterior sides of said arm, and said cap is connected directly to said connecting device via engagement of said protrusions of said connecting device with said recesses of said cap.

* * * * *